3,125,559
PROCESS FOR POLYMERIZING UNSATURATED MONOMERS WITH A CATALYST CONTAINING A METAL SALT PLATED ON A METAL
Edward C. Shokal, Walnut Creek, and Glen A. Short, Concord, Calif., assignors to Shell Oil Company, a corporation of Delaware
No Drawing. Filed Apr. 22, 1959, Ser. No. 808,019
14 Claims. (Cl. 260—93.7)

This invention relates to the polymerization of unsaturated monomers. More particularly, the invention relates to a new process for polymerizing unsaturated monomers using a special type of metal-containing catalyst.

Specifically, the invention provides a new and highly efficient process for polymerizing unsaturated monomers, and particularly monomers capable of forming stereospecific polymer as propylene, which comprises contacting the unsaturated monomer with a catalyst composition comprising crystals of a salt of a metal of the group consisting of cobalt, magnesium and cerium, coated on the surface with a thin layer of a metal of the group consisting of titanium, vanadium, cobalt and zirconium, preferably in combination with a metal alkyl cocatalyst, in an inert atmosphere and substantially anhydrous conditions.

It is known that monomers, such as propylene, can be converted to polymers having an oriented structure by contacting the monomer with metal salts, such as titanium trichloride, in combination with aluminum trialkyl. While this process gives a good yield of the desired isotactic polymer, it involves the consumption of a considerable amount of titanium salt. This is undesirable because of cost as well as the fact that this technique gives rise to complications in the cleaning up of the polymer. It would be highly desirable to find a catalyst system that would give stereospecific polymers without the utilization of such large amounts of catalysts.

It is, therefore, an object of the invention to provide a new process for polymerizing unsaturated monomers. It is a further object to provide a new process for polymerizing unsaturated monomers using a new type of metal-containing catalyst. It is a further object to provide new process of polymerization that is effective with both unsaturated hydrocarbon and vinyl monomers. It is a further object to provide a new process for preparing oriented and unoriented polymer. It is a further object to provide a new process for polymerizing monomers capable of forming stereospecific polymers without the consumption of large amounts of expensive titanium salts. It is a further object to provide a method for polymerization that permits more efficient clean up of polymer. It is a further object to provide a new method for polymerizing propylene to form isotactic polypropylene. Other objects and advantages of the invention will be apparent from the following detailed description thereof.

It has now been discovered that these and other objects may be accomplished by the new process of the invention which comprises contacting the unsaturated monomer, and preferably one capable of forming stereospecific polymers, with a catalyst composition comprising small crystals of a salt of a metal of the group consisting of cobalt, magnesium and cerium, coated on the surface with a very thin layer of a metal of the group consisting of titanium, vanadium, cobalt and zirconium, preferably in combination with a metal alkyl cocatalyst, in an inert atmosphere and substantially anhydrous conditions. It has been found that these special metal-plated catalysts have, particularly when used in combination with metal alkyl cocatalysts, unexpected polymerization activity. Despite the absence of the free salts, such as titanium halide salts, they are able to convert monomers, such as propylene, into stereospecific type polymers.

These catalysts are particularly outstanding in that they produce large quantities of the polymer without consumption of large amounts of the rather expensive metal portion of the catalyst. The use of this new catalyst, for example, results in the production of from 10 to 20 times more polypropylene per pound of titanium than the conventional titanium trihalide catalyst system. The new process also provides more efficient clean up of the polymer because of the use of smaller amounts of metal catalyst.

Further improvement is found in the fact that the new process is effective with both hydrocarbon monomers and vinyl monomers. Thus, besides polymers of hydrocarbons as propylene, and styrene stereospecific polymers are obtained from vinyl monomers as alkyl acrylates.

The new catalyst compositions used in the process of the invention comprise crystals of a salt of a metal of the group consisting of cobalt, magnesium and cerium, coated on the surface with a thin layer of a metal of the group consisting of titanium, vanadium, cobalt and zirconium. The salt coated with the metal may be any salt of cobalt, magnesium and cerium, but for ease in preparation as noted below, the salt is preferably one that is stable above 300° C. and is preferably one that is free of oxygen. Preferred salts are the halogen-containing salts, such as those containing chlorine, bromine and fluorine, and other salts, such as the sulfides, phosphines, silicides and the like. Examples include: cobaltous chloride and bromide, magnesium dichloride and cerium tribromide and chloride, cobaltous fluoride and iodide.

The size of these metal salt crystals must be rather small so as to provide the right amount of metal coated surface. The crystals preferably have a size between about 1 to 600 mesh, and still more preferably between 100 to 300 mesh. The crystal size should preferably be as uniform as possible.

The metal to be used for plating the above-noted metal salts include titanium, vanadium and zirconium or any mixture of these metals.

The metal or metals plated on the surface of the above-described crystals should only be in the form of a thin layer. In this regard, the new catalysts are distinguished from catalysts prepared by a mass plating of one material with a metal. Such prior known materials are not effective in the polymerization as the present catalysts. The metal layer in the present case varies from about 1 to 1000 molecules thick and should not be more than 2000 molecules thick. Best results are obtained when the metal layer is about 10 to 100 molecules thick.

The ratio of the amount of metal plated on the surface to the amount of the metal salt plated may vary depending upon the activity desired and the metal and metal salt involved. Generally, the amount of the metal varies from about .1 to 10 milligrams per gram of the metal salt. Preferably, the amount of metal varies from .1 to 5 milligrams per gram of the metal salt.

The new catalyst compositions may be prepared by a variety of methods. The preferred method for preparing the catalyst involves vacuum plating of the metal salt with the desired metal. According to this preferred method, the metal salt to be plated is ground to a fine powder and then placed in a reaction flask containing a tungsten electrode having strips of the desired metal or metals to be plated, e.g. titanium, vanadium, cobalt or zirconium, attached to the electrode and having means for evacuating the reaction chamber. The vessel is then heated and evacuated to a low pressure. This effects a cleaning of the surface of the metal salt particles so that there will be better adhesion of the metal. Temperatures used in this step will preferably be above 200° C., and still more preferably between 300° C. and 450° C. The heating is conducted for a short period and generally between 10 to 60 minutes depending on the cleanliness of the metal salt particles. The evacuation is preferably taken to a pressure below about $10^{-3}$ mm., and still more preferably below about $10^{-5}$ mm.

After the heating and evacuation, the tungsten electrode is then heated to a temperature needed to vaporize the metal strips. This temperature will vary depending on the metal selected. In general, temperatures ranging between 1400° C. to 1700° C. will be sufficient to effect the vaporization of the metal.

During the vaporization of the metal, it is preferred to stir or agitate the metal salts so that there will be an opportunity for a plating of the whole surface of the salt crystals rather than just the upper portion. Stirring can be accomplished by any suitable means, such as glass stirrers, magnetic stirring, vibration, tumbling and the like.

The length of heating the electrode will depend upon the thickness of the metal desired on the metal salt crystals. In general, the desired layer of 1 to 1000 molecules of the metal can be obtained in a heating period ranging from about 10 minutes to about 2 hours. Preferred thickness of about 10 to 100 molecules may be obtained in period ranging from about 10 to 60 minutes.

A more detailed description of the method for vacuum plating metal salt crystals may be found in "Vacuum Deposition of Thin Films," by L. Holland, 1st ed., 1956.

After the catalysts have been prepared as noted above, they are preferably kept from moisture and away from oxygen, such as in a moisture free container and in the presence of an inert gas such as nitrogen, until they are utilized in the polymerization reaction.

Other methods that may be used for producing the new catalysts comprise the decomposition of metal-carbon bonds in the preesnce of the metal salt, the reduction of unstable salts and organo metallic compounds. The organo metallic compounds used for this purpose are preferably those that do not contain unpaired electrons, such as elements of groups 5 and 6 of the periodic table of elements.

The new catalysts used in the process of the invention look substantially the same as the metal salts coated with the exception that they have a slightly darker color. The catalyst can not be separated in the free metal and the free salt by use of solvents or water.

The process of the invention comprises contacting the unsaturated monomers to be polymerized with the above-described special catalyst compositions, preferably in combination with a metal alkyl cocatalyst. The metal alkyl used may be any of the known compounds having a hydrocarbon radical attached directly to metal, such as for example, alkyl derivatives of aluminum, tin, lithium, sodium, titanium, zinc, cadmium, zirconium and cobalt, such as aluminum triethyl, aluminum triisobutyl, aluminum diethyl chloride, aluminum triamyl, tin tetraethyl, tin tetraphenyl, lithium butyl, sodium butyl, lithium phenyl, diethyl zinc, diethyl cadmium, aluminum triphenyl and the like, and mixtures thereof. Particularly preferred are the alkyl derivatives of groups IV to VI of the periodic table of elements, and preferably those wherein the alkyl groups contain no more than 6 carbon atoms each.

The special metal-plated salts and the metal alkyls are combined so as to have the metal in the metal alkyl and the metal in the special salt, i.e. the metal placed on the surface, in a weight ratio of .5 to 1 to 50 to 1. Preferably, these metals are combined in a weight ratio of 3 to 1 to 20 to 1.

The polymerization is accomplished by merely contacting the monomer to be polymerized with the new catalyst composition alone or with cocatalyst in an inert atmosphere and under substantially anhydrous conditions. The new catalyst composition and the metal alkyl may be added to the reaction mixture together, separately, or they may be premixed before being added to the reaction vessel. The monomer and catalyst may be brought into contact merely by mixing and stirring.

The amount of the new catalyst composition to be employed will vary depending upon the rate and conversion of polymer desired. Thus, for example, if a slow rate and low conversion is desired, one should use a small amount of catalyst, and if one desires a fast rate and high conversion, larger amounts of catalyst should be employed. In general, the amount of the new catalyst employed will vary from about .5 to 5 parts by weight per 100 parts of the monomer to be polymerized. Preferred amounts of catalyst range from about .7 to 3 parts by weight per 100 parts of monomer.

The polymerization is preferably accomplished at low temperatures and pressures. Temperatures ranging from about 25° C. to about 110° C. or slightly higher are particularly preferred. Especially attractive temperatures range from about 40° C. to 80° C.

Preferred pressures range from about atmospheric pressure up to about 1000 p.s.i. The exact pressure selected will generally depend on the rate selected as the rate is roughly proportional to the pressure, i.e. by doubling the pressure one may double the rate of polymerization. Very satisfactory rates are obtained by using pressures ranging from about 50 p.s.i.g. to 200 p.s.i.g.

The polymerization may be conducted in the presence or absence of solvents. Solvents are preferred as the catalysts display greater activity therein, and it is usually easier to remove the product from the reaction vessel, and they assist in removal of the heat of reaction. Preferred solvents are the inert hydrocarbons, such as octane, isooctane, n-heptane, xylene, benzene and the like. The solvent is usually employed so as to form rather dilute solutions, i.e. 10 to 30% solutions of the monomer.

Additives may also be employed in the reaction to increase rate of polymerization, control molecular weight, etc. Examples of such materials include, among others, hydrogen, oxygen, acetylene, Lewis bases as pyridine, esters as ethyl acetate, tributyl phosphite phenals, and the like. Amounts of such materials may vary from as little as .001 to as high as 50% by weight of the monomer being polymerized.

Other metal salts, such as titanium halides and the like may also be included.

As noted above, the polymerization process is conducted in an inert atmosphere. This is preferably accomplished by sweeping out the reaction zone with an inert gas and maintaining an atmosphere of inert gas during the course of the reaction. Suitable inert materials include nitrogen, methane and the like.

The process should also be conducted under substantially anhydrous conditions. This is accomplished by using anhydrous reactants and dry reaction vessels and maintaining customary precautions during the reaction to keep water out of the reaction vessel.

After the completion of the polymerization reaction, the catalyst and solvent are removed from the polymer. This is preferably accomplished by adding an acidified alcoholic solution to the reaction mixture. This causes precipitation of the polymer and the catalyst (which enters by solution and reaction with the alcohol) is removed in the alcoholic fraction.

The products formed by the above-described process will be relatively high molecular weight solid polymers. The products may be used in making fibers, films and various molded articles. The products will preferably have molecular weights ranging from about 50,000 to 1,000,000 as determined by the light scattering technique, and will have melting points preferably ranging from about 90° C. to 330° C. The polymers prepared from monomers, such as propylene, butene and styrene have an isotactic structure as evidenced by insolubility in appropriate solvents as n-heptane.

The process of the invention may be used to homo- or copolymerize unsaturated monomers and preferably those capable of forming stereospecific polymers, such as, for example, alpha-olefins as propylene, ethylene, isobutylene, isoamylene, hexylene, decene, dodecene, octadecene, butadiene, isoprene methyl pentadiene, dimethyl butadiene, piperylene, and the like, and mixtures thereof. The process may also be used to polymerize the vinyl type monomer, such as unsaturated acids, such as acrylic and methacrylic acid, esters of these acids, such as methyl methacrylate, butyl acrylate, and propyl acrylate; the vinylidene halides, such as vinyl chloride and vinylidene bromide; unsaturated nitriles, such as acrylonitrile and methacrylonitrile; vinyl esters of monocarboxylic acids, such as vinyl acetate, and vinyl butyrate; unsaturated esters of polycarboxylic acids, such as divinyl succinate, divinyl adipate, divinyl phthalate, diallyl phthalate, vinyl allyl pimelate; the unsaturated esters of unsaturated monocarboxylic acids, such as vinyl acrylate, allyl acrylate, vinyl crotonate, vinyl methacrylate and the like; unsaturated ethers, such as diallyl ether, allyl butyl ether, vinyl allyl ether; and the vinyl ketones, such as vinyl butyl ketone and vinyl ethyl ketone. This group also includes the polyunsaturated compounds such as obtained by esterifying a glycol of trihydric alcohol, such as ethylene glycol, glycerine, hexanetriol and the like, with an unsaturated acid, as acrylic acid or methacrylic acid, as well as the polyunsaturated ethers obtained by etherifying these polyhydric alcohols with unsaturated alcohols, such as triallyl ether of glycerol, triallyl ether of hexanetriol and the like, and mixtures thereof.

Preferred monomers to be employed include the monomers possessing a single $CH_2=C=$ group, and more preferably the alpha-olefins and those having electron negative groups not more than three carbon atoms removed from the double bond. Especially preferred are the alpha-olefins, and preferably those containing up to eight carbon atoms, styrene, alkyl and chloro-substituted styrenes and acrylic and alkyl-substituted acrylic acids and their alkyl esters, and preferably those wherein the alkyl groups contain up to eight carbon atoms.

In making the copolymers, the monomers may be utilized in any range of proportions, such as .1% up to 99.9% by weight of one monomer with 99.9% to .1% of the other monomer. Three, four and higher component copolymers may also be prepared.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts described in the examples are parts by weight.

*Example I*

This example illustrates the preparation and use of a catalyst composition comprising cobaltous chloride coated with a thin layer of titanium metal.

100 parts of cobaltous chloride crystals having a size of about 100 mesh were placed in a reaction vessel containing a tungsten electrode having attached thereto small pieces of titanium metal. The reaction vessel was heated to 400° C. and evacuated to a pressure of $10^{-5}$ mm. while heating at 400° C. When this vacuum was obtained the tungsten electrode was heated to a temperature of about 1500° C. to 1600° C. for 20 minutes. The cobaltous chloride crystals in the bottom of the vessel were stirred by means of a magnetic stirrer. At the end of the heating period, the temperature was reduced, and the crystals removed to a moisture free container having an inert atmosphere. The crystals obtained as the product of the above process appeared to have a slightly grayer color than before the treatment and analysis indicated that the crystals contained about .5 milligrams of bound titanium per gram of cobaltous chloride salt.

1 part of the catalyst prepared as above was then introduced into a reaction vessel containing 100 parts by weight of anhydrous heptane and .2 part by weight aluminum triethyl. This was done under nitrogen and in the absence of moisture. Anhydrous propylene was then introduced into this mixture with a pressure of about 210 p.s.i.g. (introduction of about 25 parts of monomeric propylene). The mixture was then agitated by tumbling at a temperature to 50° C. for about 24 hours. The resulting mixture was then poured into isopropanol to precipitate the polymer. The resulting product was a white crystalline solid. The polymer could be molded by conventional means to form a hard flexible molding.

40,000 lbs. of polymer per lb. of titanium can be obtained by the use of the above-described catalyst system. In a related experiment wherein the process was duplicated with the exception that the special titanium plated catalyst was replaced with titanium trichloride, only about 1000 lbs. of polypropylene per lb. of titanium was obtained.

In a further experiment, the special titanium plated catalyst was replaced by a mixture of titanium metal and the colbaltous chloride. No polypropylene was obtained in this case. This demonstrates that the above-described catalyst has the titanium metal plated directly on the salt structure rather than existing as free titanium.

*Example II*

This example illustrates the preparation and use of a catalyst composition comprising magnesium dichloride plated with titanium metal.

100 parts of magnesium dichloride crystals having a size of about 100 mesh were placed in a reaction vessel equipped with a tungsten electrode having attached thereto small pieces of titanium metal. The reaction vessel was heated to 400° C. and evacuated to a pressure of $10^{-5}$ mm. while heating at 400° C. When this vacuum was obtained the tungsten electrode was heated to a temperature of about 1500° C. to 1600° C. for 20 minutes. The magnesium dichloride crystals at the bottom of the vessel were stirred by means of a magnetic stirrer. At the end of the heating period, the temperature was reduced, and the crystals removed to a moisture free container having an inert atmosphere. The crystals that were obtained by the above process appeared to be the same as before with the exception that they had a slightly grayer color. Analysis indicated that the crystals contained about .5 milligram of bound titanium per gram of magnesium dichloride salt.

1 part of the catalyst prepared as above was then introduced into a reaction vessel containing 100 parts of anhydrous heptane and .2 part of aluminum triethyl. This was done under nitrogen and in the absence of moisture. Anhydrous propylene was then introduced into this mixture with a pressure of about 210 p.s.i.g. The mixture was then agitated by tumbling at a temperature of 50° C. for about 24 hours. The resulting mixture was then poured into isopropanol to precipitate the polymer. The resulting product was a white solid polymer which could be molded to form a flexible molding.

The above polymerization process was repeated using only the special titanium coated magnesium dichloride salt as the catalyst. Solid polypropylene was obtained.

In a further experiment, the special titanium plated catalyst was replaced by a mixture of titanium metal and the magnesium dichloride salt. No polypropylene was obtained.

*Example III*

This example illustrates the preparation of a catalyst composition comprising cobaltous bromide coated with a thin layer of vanadium and the use of this catalyst in the polymerization of propylene.

100 parts of cobaltous bromide crystals having a size of about 100 mesh were placed in a reaction vessel equipped with a tungsten electrode having attached thereto small pieces of vanadium metal. The reaction vessel was heated to 400° C. and evacuated to a pressure of about $10^{-5}$ mm. while heating at 400° C. When this vacuum was obtained, the tungsten electrode was heated to a temperature of about 1500° C. for 20 minutes. The cobaltous bromide crystals at the bottom of the vessel were stirred by means of a magnetic stirrer. At the end of the heating period, the temperature was reduced, and the crystals removed to a moisture free container having an inert atmosphere. The crystals that were obtained by the above process appeared to be the same as before with the exception that they had a slightly darker color. Analysis indicated that the crystals contained about .6 milligram of bound vanadium per gram of the cobaltous bromide salt.

1 part of the catalyst prepared as above was then introduced into a reaction vessel containing 100 parts of anhydrous heptane and .2 part of aluminum triethyl. This was done under nitrogen and in the absence of moisture. Anhydrous propylene was then introduced into this mixture with a pressure of about 120 p.s.i.g. The mixture was then agitated by tumbling with a temperature of 50° C. for about 24 hours. The resulting mixture was then poured into isopropanol to precipitate the polymer. The resulting product was a white solid polymer which could be molded to form a flexible molding.

In a further experiment, the special vanadium plated catalyst was replaced by a mixture of vanadium metal and cobaltous bromide. No polypropylene was obtained.

Related results are obtained by replacing the cobaltous bromide in the above process with magnesium chloride.

*Example IV*

This example illustrates the preparation of a catalyst composition comprising a cerium chloride crystals plated with vanadium metal and the use of the catalyst for polymerizing propylene.

100 parts of cerium trichloride crystals of about 100 mesh size were placed in a glass container equipped with a tungsten electrode containing vanadium metal strips. The vessel was heated to 400° C. and then vacuum was applied to obtain a pressure of $10^{-5}$ mm. while heating at 400° C. The tungsten electrode then heated to a temperature of about 1500° C. The cerium chloride crystals were stirred by means of a magnetic stirrer. At the end of 20 minutes, the temperature was reduced and the crystals removed to a moisture free container. Analysis indicated the crystals contain about .5 milligram of bound vanadium per gram of salt.

1 part of the catalyst prepared as described above was introduced into a stainless steel reactor containing 100 parts of anhydrous heptane and .2 part of aluminum triethyl. Propylene introduced into the mixture with a pressure of about 120 p.s.i.g. The mixture was maintained with stirring at a temperature of about 50° C. for about 24 hours. Polymer was precipitated as in Example I. Resulting product was a high molecular white solid polymer which could be molded to form a hard flexible molding.

Copolymers are obtained by replacing the propylene with a 50/50 mixture of propylene and ethylene and propylene and butene-1.

*Example V*

This example illustrated the preparation of a catalyst composition comprising magnesium dichloride crystals plated with a thin layer of zirconium metal, and the use of this catalyst for polymerizing propylene.

100 parts of magnesium dichloride crystals of about 100 mesh size were placed in a glass reactor equipped with tungsten electrode having zirconium metal strips attached at the end. The vessel was heated to 400° C. and then reactor evacuated to a pressure of about $10^{-5}$ mm. The tungsten electrode was then heated to 1200° C. At the end of 20 minutes, the crystals were removed and stored under nitrogen in a moisture free container. Analysis indicated the crystals contained .5 g. of zirconium per gram of salt.

1 part of the catalyst composition prepared as above were placed in a stainless steel reactor containing 100 parts of anhydrous heptane and 2 parts of aluminum triethyl. Anhydrous propylene introduced into this mixture with a pressure of about 120 p.s.i.g. The mixture was maintained with stirring at a temperature of 50° C. for about 24 hours. Polymer was precipitated as in Example I. The resulting product was a high molecular solid polypropylene which could be molded to form a hard flexible molding.

*Example VI*

This example illustrates the preparation of a catalyst composition comprising cobaltous chloride crystals plated with zirconium metal and the use of this catalyst for polymerizing propylene.

100 parts of the cobalt chloride crystals of about 100 mesh size were placed in a glass reactor equipped with tungsten electrode having zirconium strips attached to the ends of the electrode. The vessel was heated to 400° C. and the reactor evacuated to a pressure of $10^{-5}$ mm. The electrode was then heated to a temperature of about 1500° C. The cobaltous chloride crystals were stirred by means of a magnetic stirrer. After about 20 minutes, the crystals were removed and stored under nitrogen in a moisture free atmosphere. Analysis indicated there was about .4 milligram of zirconium per gram of salt.

1 part of the catalyst prepared as above was placed in a stainless steel reactor containing 100 parts of anhydrous heptane and .2 part of aluminum triethyl. Anhydrous propylene introduced into this reaction mixture with a pressure of 120 p.s.i.g. The mixture was maintained by stirring at a temperature of 50° C. for about 24 hours. The polymer was precipitated as in Example I. The resulting product was a high molecular which solid proylene which could be molded to form a hard flexible molding.

Related results are obtained by replacing the propylene in the polymerization process with ethylene.

Related results are also obtained by replacing the propylene in the polymerization process with styrene.

Polymers are also obtained by introduction of butadiene and isoprene in places of propylene.

*Example VII*

This example illustrates the use of a catalyst prepared as in Example I for polymerizing methyl methacrylate.

1 part of the catalyst prepared by coating cobaltous chloride with titanium as shown in Example I was introduced into a reaction vessel containing 100 parts of anhydrous benzene and .2 part of aluminum triethyl. 25 parts of methyl methacrylate was then introduced into the reactor and the mixture agitated at a temperature of 50° C. for several hours. The resulting mixture was then poured into petroleum ether to precipitate the polymer. The product was a white solid polymer having a melting point about 200° C.

The above process was repeated with the exception that the aluminum triethyl was replaced by aluminum triisobutyl and aluminum diethyl chloride. Related results are obtained.

Copolymers are obtained by replacing the methyl methacrylate in the above process with 50/50 mixture of methyl methacrylate and butyl methacrylate.

*Example VIII*

This example illustrates the use of a catalyst prepared from cobaltous chloride coated with titanium for the polymerization of vinyl chloride.

1 part of the cobaltous chloride-titanium catalyst as prepared in Example I was introduced into a reaction vessel containing 100 parts of anhydrous benzene and .2 part of aluminum triethyl. This was done under nitrogen and in the absence of moisture. 25 parts of vinyl chloride was then introduced into the reaction vessel. The mixture was then agitated by tumbling at a temperature of 50° C. for several hours. The resulting mixture was poured into petroleum ether to precipitate the polymer. The resulting product was a white solid polymer which could be molded to form a flexible molding.

The above process was repeated with the exception that the aluminum triethyl was replaced by aluminum diethyl chloride. Related results are obtained.

*Example IX*

This example illustrates the use of a catalyst of the present invention in polymerizing methacrylic acid.

1 part of a cobaltous chloride-titanium catalyst as prepared in Example I was introduced into a reaction vessel containing 100 parts of anhydrous benzene and .2 part of aluminum triethyl. This was done under nitrogen in the absence of moisture. 25 parts of methacrylic acid was then introduced into the mixture and the mixture heated to 50° C. for several hours. The resulting mixture was then poured into petroleum ether to precipitate the polymer. The resulting product was a white solid polymer.

Copolymers are obtained by replacing the methacrylic acid with a 75/25 (by weight) mixture of methacrylic acid and acrylic acid.

*Example X*

1 part of the cobaltous chloride-titanium catalyst prepared as in Example I was introduced into a reaction vessel containing 100 parts of benzene and .2 part of aluminum triethyl. Anhydrous methyl acrylate was then introduced into the mixture and the mixture heated at 50° C. for several hours. Resulting mixture was then poured into petroleum ether to precipitate the polymer. The resulting product was a white solid polymer that could be molded to form a flexible molding.

*Example XI*

This example illustrates the preparation of catalyst using a mixture of metals.

100 parts of cobaltous chloride crystals having the size of 100 mesh were placed in a reaction vessel containing two tungsten electrodes, one of which had attached thereto a small piece of titanium and the other one having attached thereto a small piece of aluminum. The reaction vessel was heated to 400° C. and evacuated to a pressure of $10^{-5}$ mm., while maintaining the temperature at 400° C. When this vacuum had been obtained the tungsten electrodes were heated to a temperature of about 1500° C. to 1600° C. for 20 minutes. The cobaltous chloride crystals were stirred by means of a magnetic stirrer. At the end of the heating period the temperature was reduced and the crystals removed to a moisture free container having an inert atmosphere. The crystals obtained as a product of the above process appeared to have a slightly grayer color than before the treatment and analysis indicated that the crystals were coated with a molecularly thin layer of the mixture of titanium and aluminum.

1 part of the catalyst prepared as above was then introduced into a reaction vessel containing 100 parts by weight of anhydrous heptane and .2 part by weight of aluminum triethyl. This was done under nitrogen and in the absence of moisture. Anhydrous propylene was then introduced into this mixture with a pressure of about 120 p.s.i.g. (introduction of about 25 parts of monomeric propylene). The mixture was then agitated by tumbling at a temperature of 50° C. for about 24 hours. The resulting mixture was then poured into isopropanol to precipitate the polymer. The resulting was a white crystalline solid. The polymer could be molded by conventional means to form a solid flexible molding.

The above-described process was repeated with the exception that the metals employed on the tungsten electrodes were titanium and iron, titanium and zirconium and titanium and vanadium. Related results are obtained in each case.

*Example XII*

This example illustrates the preparation of a catalyst on a carrier such as sodium chloride.

21 parts of sodium chloride was added to 100 parts of a saturated solution of cobaltous chloride in isobutanol. This mixture was then evaporated with stirring. The resulting crystals were analyzed and shown to contain 40 milligrams of cobaltous chloride per gram of sodium chloride.

Sufficient amount of these crystals to furnish 100 parts of the cobaltous chloride were placed in a glass reactor equipped with tungsten electrodes having titanium metal strips attached at the end. The reaction vessel was heated to 400° C. and evacuated to a pressure of about $10^{-5}$. When this vacuum was obtained the tungsten electrode was heated to a temperature of about 1500° C. for 20 minutes. Cobaltous chloride-sodium chloride crystals at the bottom were stirred by means of a magnetic stirrer. At the end of the heating period the temperature was reduced to a moisture free container having an inert atmosphere. The crystals that were obtained appeared to be the same as before with the exception that they had a slightly darker color. Analysis indicated that the crystals contained about .5 milligram of titanium per gram of the cobaltous chloride.

1 part of the catalyst prepared as above was then introduced into a reaction vessel containing 100 parts by weight of anhydrous heptane and .2 part by weight of aluminum triethyl. This was done under nitrogen and in the absence of moisture. Anhydrous propylene was then introduced into this mixture with a pressure of about 120 p.s.i.g. (introduction of about 25 parts of monomeric propylene). The mixture was then agitated by tumbling at a temperature of 50° C. for about 24 hours. The resulting mixture was then poured into isopropanol to precipitate the polymer. The resulting product was a white crystalline solid. The polymer could be molded by conventional means to form a solid flexible molding.

The above process was repeated with the exception that the sodium chloride was replaced by lithium chloride and barium sulfate. Related results are obtained in each case.

*Example XIII*

Example I was repeated with the exception that the metal was cobalt. Related results are obtained.

We claim as our invention:

1. A process for polymerizing ethylenically unsaturated monomers which comprises contacting the ethylenically unsaturated monomer with a catalyst consisting essentially of a product obtained by plating an inorganic salt which is stable above 300° C., is free of oxygen and contains a metal of the group consisting of cobalt, magnesium, and cerium and mixtures thereof, with a layer from 1 molecule to 2,000 molecules thick of a metal of the group consisting of titanium, vanadium, cobalt and zirconium and mixtures thereof, said plating being accomplished at a temperature above 200° C.

2. A process as in claim 1 wherein the metal salt to be coated is a cobalt halide.

3. A process for polymerizing ethylenically unsaturated monomers capable of forming stereospecific polymers which comprises contacting the ethylenically unsaturated monomer with (1) a catalyst consisting essentially of a product obtained by plating an inorganic salt which is stable above 300° C., is free of oxygen and contains a metal of the group consisting of cobalt, magnesium, and cerium and mixtures thereof with a layer of from 1 molecule to 2,000 molecules thick of a metal of the group consisting of titanium, vanadium, cobalt and zirconium and mixtures thereof, said plating being accomplished at temperatures above 200° C. and (2) a cocatalyst consisting essentially of a metal alkyl of the group consisting of aluminum, tin, lithium, sodium, zinc, cadmium and cobalt alkyls, the metal plated on the surface of the inorganic salt and the metal in the metal alkyl being present in a weight ratio between .5:1 and 10:1, said polymerization being conducted under substantially anhydrous conditions.

4. A process as in claim 3 wherein the metal salt to be coated on the surface is magnesium dichloride.

5. A process as in claim 3 wherein the metal salt to be coated on the surface is a cerium halide.

6. A process as in claim 3 wherein the catalyst defined in (1) is cobaltous chloride plated with titanium metal.

7. A process as in claim 3 wherein the catalyst defined in (1) is magnesium dichloride coated with titanium metal.

8. A process as in claim 3 wherein the catalyst defined in Section I is a cerium trichloride coated with vanadium metal.

9. A process as in claim 3 wherein the catalyst defined in Section I is cobalt dichloride plated with zirconium metal.

10. A process as in claim 3 wherein the metal alkyl is an aluminum alkyl wherein the alkyl groups contain no more than 8 carbon atoms.

11. A process as in claim 3 wherein the monomer to be polymerized is an alpha-olefin containing no more than 6 carbon atoms.

12. A process as in claim 3 wherein the monomer to be polymerized is propylene.

13. A process as in claim 3 wherein the polymerization is conducted at a temperature between 30° C. and 100° C. and a pressure between 10 p.s.i. and 500 p.s.i.

14. A process for preparing polypropylene which comprises contacting the propylene with (1) a catalyst consisting essentially of cobaltous dibromide crystals which have been plated on the surface at a temperature above 200° C. with a layer of from 1 molecule to 2,000 molecules thick of titanium metal and (2) a cocatalyst consisting essentially of an aluminum trialkyl, at a temperature between 30° C. and 100° C. under an inert atmosphere and under substantially anhydrous conditions.

References Cited in the file of this patent

UNITED STATES PATENTS

| 2,905,645 | Anderson et al. | Sept. 22, 1959 |
| 2,930,767 | Novak | Mar. 29, 1960 |

FOREIGN PATENTS

| 1,132,506 | France | Nov. 5, 1956 |